United States Patent [19]

Kohlheb

[11] Patent Number: 4,765,893
[45] Date of Patent: Aug. 23, 1988

[54] COILED MEMBRANE FILTER CARTRIDGE

[76] Inventor: Robert Kohlheb, Andershäuser Strasse 15, D-3352 Einbeck, Fed. Rep. of Germany

[21] Appl. No.: 886,102

[22] Filed: Jul. 16, 1986

[30] Foreign Application Priority Data

Jul. 18, 1985 [DE] Fed. Rep. of Germany ....... 3525682

[51] Int. Cl.⁴ ............................................. B01D 29/06
[52] U.S. Cl. ................... 210/315; 210/321.83; 210/497.1; 55/520
[58] Field of Search ............ 210/304, 305, 315, 321.1, 210/443, 444, 446, 448, 449, 452, 493.4, 497.1; 55/498, 520

[56] References Cited

U.S. PATENT DOCUMENTS

| 2,351,053 | 6/1944 | Klett | 210/305 |
| 3,006,480 | 10/1961 | Russell | 210/493.4 |
| 4,039,457 | 8/1977 | Schacht et al. | 210/493.4 |
| 4,235,723 | 11/1980 | Bartlett, Jr. | 210/497.1 |
| 4,310,419 | 1/1982 | Nara et al. | 210/493.4 |
| 4,600,416 | 7/1986 | Mann | 55/520 |

FOREIGN PATENT DOCUMENTS

| 543951 | 7/1957 | Canada | 210/497.1 |
| 7204 | 1/1982 | Japan | 210/493.4 |
| 2047107 | 11/1980 | United Kingdom | 210/493.4 |

Primary Examiner—Richard V. Fisher
Assistant Examiner—Wanda L. Millard
Attorney, Agent, or Firm—Spencer & Frank

[57] ABSTRACT

A coiled membrane filter cartridge includes a central pipe having at least one axial row of openings through which fluid may radially pass into or out of the pipe and two superposed membranes wound in a plurality of turns about the pipe to form a membrane coil having opposite axial ends. The membranes are radially spaced from one another for defining, between themselves, a spiral flow channel being sealed at the axial ends. A fluidtight partition extends between the membranes and is connected thereto. The partition divides longitudinally the spiral flow channel into axially adjoining partial channels.

11 Claims, 3 Drawing Sheets

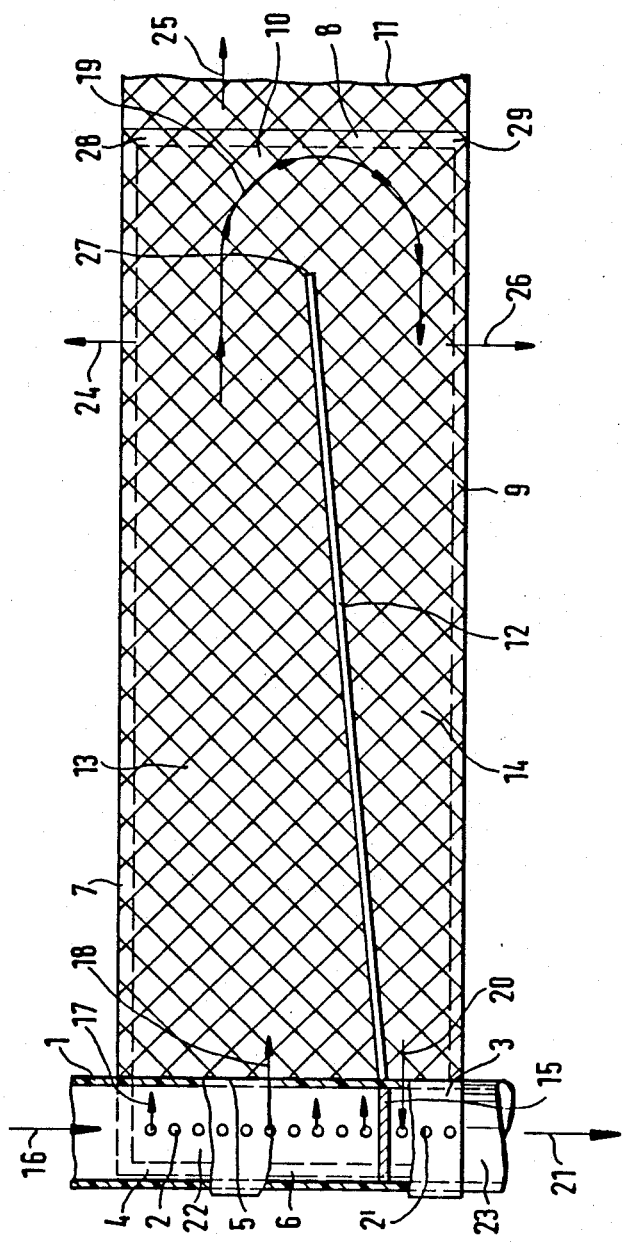

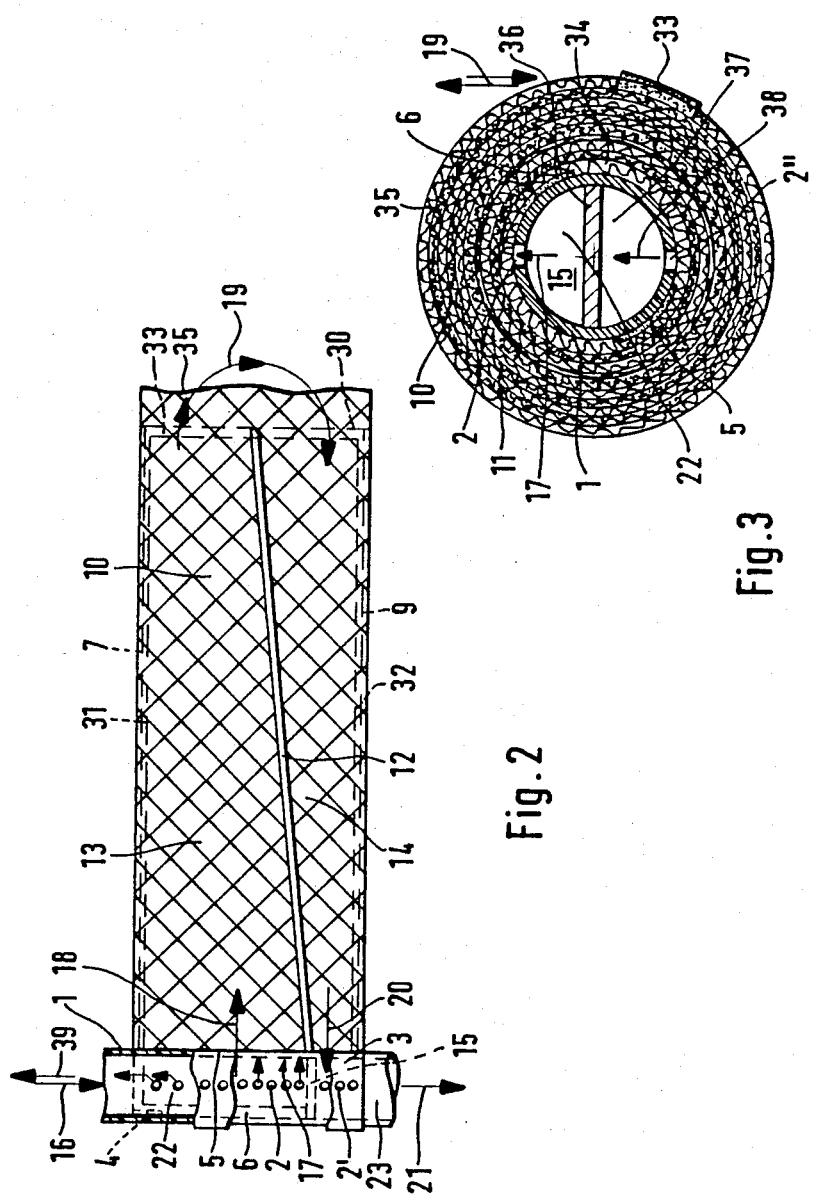

COILED MEMBRANE FILTER CARTRIDGE

BACKGROUND OF THE INVENTION

This invention relates to a coiled membrane filter cartridge of the type which has a central pipe having an axial series of apertures in its jacket. On the pipe there are spirally wound at least two membranes which include at least one flow channel closed at the axial coil ends.

Coiled membrane filter cartridges, enclosed in a housing individually or in a plurality and connected in series or parallel with one another, are used in various fields of the filtration art, for example for fine filtration, microfiltration, ultrafiltration, for reverse osmosis, pervaporation and gas permeation. The term "filter" in all its modifications employed within the scope of the present invention is thus not to be understood to be limited to mere filtration processes but is expressly meant to also include separation processes similar to filtration, such as, for example, the above-mentioned processes, and particularly reverse osmosis. The term "filtration" should therefore be understood hereinafter as an abbreviation for the above-mentioned filtration processes and related processes, with the term "related processes" referring, in particular, to biotechnological exchange processes.

Known coiled membrane filter cartridges of the above-mentioned type are so structured, that the medium to be treated has, along the entire flow path, the same velocity relative to the membrane surfaces independently of whether the flow is axial, tangential or radial in individual sections. However, with respect to the process sequence of the exchange and filtering processes of the type in question, it would in most cases be desirable to guide the medium to be treated, at a slower speed as it initially flows on the membrane surface and to then gradually and continually increase its speed until the medium flows away from the membrane surface as a concentrate.

SUMMARY OF THE INVENTION

It is therefore the object of the invention to provide a coiled membrane filter cartridge of the above-mentioned type in which the speed of the medium to be treated at and on the membrane over or relative to the membrane surface is a freely predeterminable function of the length of the flow path traversed on the membrane surface. Or, in case this function is a constant, with otherwise the same operating parameters, a constantly higher relative flow rate can be realized for the medium to be treated on the membrane surface compared to the prior art coiled membrane filter cartridges.

This object and others to become apparent as the specification progresses, are accomplished by the invention, according to which, briefly stated, the coiled membrane filter cartridge has at least one fluidtight partition subdividing the flow channel into at least two axially superposed partial channels.

The invention is thus based on the significant principle of subdividing conventional, open or closed membrane flow pockets for coiled membrane elements by an at least essentially elastic but in any case coilable partition into at least two partial flow channels. With a basically arbitrary geometrical configuration and a basically arbitrary shape of such a partition, hydrodynamic flow conditions, particularly flow path dependent flow velocity gradients, specifically adapted to practically any conceivable filtering task can be set without noticeable increase in apparatus in conventional cylindrical membrane coil elements. For example, the tendency of the membrane toward a flow rate reduction which tendency increases with increasing concentration of the medium to be treated, can be overcome in a simple manner by reducing the cross section of a partial channel so as to constantly or progressively increase the flow velocity of the medium as its concentration increases.

By means of a partition disposed in a membrane flow pocket or in a flow channel formed between two membranes, at least two partial channels are formed which are axially superposed on one another with respect to the coil. These partial channels may be used independently of one another in a flow in the same direction and also in countercurrent or are preferably connected in series in such a manner that at least two or, in case of a plurality of partitions, more than two partial channels are connected so as to form successive partial sections of one and the same flow path.

The technical configuration of such a partition can be realized in practice in a multitude of ways and basically in any desired manner. In the simplest case, the partition may be, for example, a glued or welded seam which directly connects together the two membranes forming the flow channel. Alternatively, a strip of material may be introduced between the two membranes which is tightly glued or welded to the two membranes in such a manner that each one of the membranes is connected only with the membrane strip without the two membranes being directly connected with one another. If conventional, usually grid-like spacers are employed in the flow channel between the two membranes, care must be taken that the partition also sealingly bridges the spacer grid between the two inner membrane surfaces. In this case, the partition is preferably provided in the form of a string which tightly, homogeneously and in an integrated manner penetrates the spacer and is preferably made of one piece therewith. If the spacer is a plastic grid, the string may be made of the same plastic in one piece with the spacer or it may be applied after manufacture of the spacer to tightly penetrate the latter, for example in the form of an elastomer string into which the grid structure of the spacer is vulcanized. Particularly in the case where the partition is made of an elastic material, it is not necessary for the partition to be initially fixed to the membranes forming the flow channel to be subdivided. Rather, it is generally sufficient for a corresponding membrane-spacer-membrane structure to be wound into a coil with slight tension and the thus formed coil is fixed under tension in a known and suitable manner, for example by pulling a more or less elastic woven stocking or a suitable shrinkable material over it. The radial coil tension of a coil produced in this manner is sufficient to assure tightness in the required manner between the two partial channels formed in the flow channel between the two membranes.

According to one feature of the invention, the partition in the uncoiled membrane is linear and extends at an angle to the longitudinal edges of the unwound coil, i.e. to the edges forming the radial end faces of the coil. In the coiled state, the partition thus describes a helix which, dependent upon its inclination, either widens or narrows radially from the interior to the exterior, when seen in the same direction of rotation. The axial height of the helix is preferably at least substantially equal to one-half the axial height of the coil, particularly if the two partial channels formed by the partition are connected in series one behind the other and form parts of a contiguous flow path. This has the result that the cross section at the outlet of the one partial channel is equal to the cross section of the inlet of the next following partial channel. The flow velocity gradient of the medium guided over the membrane surface thus remains steady even in the transition zone between partial channels.

BRIEF DESCRIPTION OF THE DRAWING

FIG. 1 is a partially sectional view of a preferred embodiment of the invention, showing the membranes in an uncoiled, developed state.

FIG. 2 is a partially sectional view of another preferred embodiment of the invention, showing the membranes in an uncoiled, developed state.

FIG. 3 is a cross-sectional view of the embodiment of FIG. 2, illustrated in a finished, coiled state.

DESCRIPTION OF THE PREFERRED EMBODIMENTS

Figure 4:
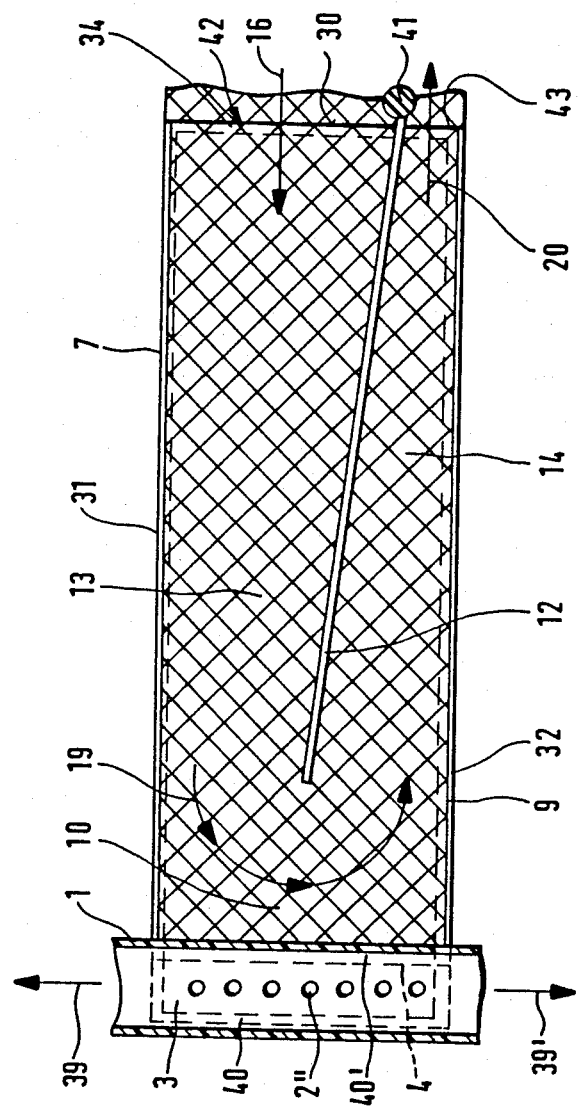
FIG. 4 is a partially sectional view of still another preferred embodiment of the invention, showing the membranes in an uncoiled, developed state.

FIG. 1 shows a first embodiment of the coiled membrane filter cartridge according to the invention in the unrolled state of the membrane coil, partially in an axial sectional view. A central pipe 1, on whose jacket a series of axial passage openings 2 are formed, is connected with two superposed membranes 3, 4 in a firm and fluidtight manner by means of diametrally opposed glued seams 5, 6. The membranes 3 and 4 are connected to one another by means of glued or welded seams 7, 8, 9. Membranes 3, 4, connected together in the described manner, thus form a membrane pocket which encloses a closed flow channel 10 along the end faces of the coil, i.e. along glued seams 7, 9 and also on the exterior of the coil, i.e. along glued seam 8. The two diametrally opposed glued seams 5, 6 at the central pipe are disposed in such a manner that passage openings 2 open into flow channel 10, i.e. flow channel 10 communicates with the interior cavity of central pipe 1 in a hydrodynamically free manner.

A conventional, grid-shaped spacer (not shown in FIG. 1) is disposed in the interior of flow channel 10. In principle, it is configured in the same manner as spacer 11 shown in FIG. 1 which rests on the exterior of the pocket formed by membranes 3, 4, i.e. on the exterior of membrane 4.

The grid-shaped spacer disposed in flow channel 10 is made of plastic, for example, polyethylene, and is provided with a linear, string-like reinforcement which is integrated in a fluidtight manner as one piece with the grid structure of the spacer and which, as a partition 12, subdivides flow channel 10 into two partial channels 13, 14 which are axially disposed one above the other with reference to the coil. Partition 12 is likewise connected in a fluidtight manner to the jacket of central pipe 1, which is accomplished in that the narrow side of the spacer and its integrated partition 12 is glued to the jacket of central pipe 1.

The partition 12 extends from central pipe 1 into flow channel 10, obliquely to glued seams 7, 9 to a point which lies at least substantially at one-half the height of flow channel 10 and also at a distance of at least substantially one-half the height of flow channel 10 from axial glued seam 8. In this way, two partial channels 13, 14 are formed which, connected in series, are hydrodynamically connected together and whose flow cross section decreases continuously from the broader inlet to the narrower outlet. At the axial height at which partition 12 is connected in a fluidtight manner with the jacket of central pipe 1, a separating bottom 15 is provided in the interior cavity of central pipe 1 to hermetically subdivide the interior cavity of central pipe 1 into a region connected with the broad opening of flow path 13, 14 and into a region connected with the narrow opening of flow path 13, 14.

The coiled membrane filter cartridge is obtained from the structure shown in FIG. 1 in that the central pipe 1 is rolled, to the right, thus winding thereon the membranes 3, 4, whereby a pocket is formed. As illustrated, the grid-like spacer 11 inserted between the individual turns of pocket 3, 4 is made longer than the membrane pocket so that the spacer surrounds the exterior of the coil in a protective and supporting manner. An elastic woven hose is then pulled over the outer layer of spacer grid 11 to prevent unrolling of the coil. The coil is wound with such tension that membranes 3, 4 are sealingly pressed against partition 12 and thus the partial channels 13, 14, except for the transition region formed between them, are hydrodynamically hermetically sealed from one another.

To operate the coiled membrane filter cartridge shown in FIG. 1 for its intended purpose, the medium to be treated is driven axially into the pipe 1 in the direction of arrow 16. Therefrom, the substance flows through passage openings 2 in the direction of arrows 17 and, in the direction of flow arrow 18, into partial channel 13 formed in flow channel 10 between the two membranes 3, 4. After flowing through partial channel 13, the stream of medium to be treated is diverted upstream of lateral glued seam 8 in the direction of flow arrows 19 and enters into the second partial section of flow channel 10, that is, into partial channel 14. From the partial channel 14 the medium to be treated flows as a concentrate in the direction of flow arrow 20 through passage openings 2' back into the interior cavity of central pipe 1 and leaves the latter axially in the direction of flow arrow 21. Mixing of the inflowing stream 16 with the outflowing concentrate stream 21 is prevented by separating bottom 15 which divides central pipe 1 into an inlet chamber 22 and a concentrate discharge chamber 23 which is hermetically sealed from the former.

The permeate passing through membranes 3, 4 reaches the spiral-shaped coil interstices held open between membrane pocket 3, 4 by spacer 11 and freely flows out from there tangentially and axially. This is shown in FIG. 1 by permeate flow arrows 24, 25, 26. The exiting permeate is then collected, for example, at the bottom of a filter housing in which the coiled membrane filter cartridge is disposed and is guided away therefrom.

As shown in FIG. 1, the flow cross section of channels 13 and 14 available for the constant volume stream of medium to be treated continuously decreases from flow inlet 18 to flow outlet 20. Thus the flow velocity of the medium to be treated relative to membranes 3, 4 increases in direct proportion to the concentration of the medium. Thus there is optimum load distribution and optimum utilization of the membrane, resulting in a long service life.

In case it is not necessary, for the purpose of certain filtering tasks, to intentionally produce a sudden change in the flow gradient of the medium to be treated in flow path 13, 14, end point 27 of partition 12 is preferably situated in such a manner that it is at least substantially equidistant from all three glued seams 7, 8, 9. If manufacturing costs permit, the flow path can be further improved by rounding the right-angle corners 28, 29 of flow channel 10 of the FIG. 1 structure to correspond to the required flow cross section.

A further embodiment of the coiled membrane filter cartridge is shown in FIGS. 2 and 3. FIG. 2 shows an unrolled membrane coil of the type shown in FIG. 1 while FIG. 3 is an axial sectional view of the coil.

In FIGS. 2 and 3, and also in FIG. 4, which relates to a third embodiment of the coiled membrane filter cartridge, parts corresponding to the parts described in connection with FIG. 1 are given the same reference numerals and, in order to avoid repetition, will not be discussed in detail below.

Essentially, the embodiment of the coiled membrane filter cartridge shown in FIGS. 2 and 3 differs from that shown in FIG. 1 in that flow channel 10 is open at the outer edge 30 of the coil, and by gluing together the winding turns of the membrane pockets along the frontal faces of the coil by means of glued seams 31, 32 and in the axial direction on the exterior of the coil by glued seam 33, it forms a permeate channel 34 which is closed on all sides to provide a fluidtight connection. It will be understood that the grid-shaped spacer 11 of the permeate channel is not brought out of the latter, while spacer 35 of flow channel 10 is brought out of the pocket formed between membranes 3, 4, in the manner indicated in FIG. 2, and around the coil by one or two turns, in the manner described in connection with FIG. 1, to serve as the outer protective and supporting sleeve.

Moreover, in the embodiment shown in FIG. 2, partition 12 extends completely to the open edge 30 of membrane pocket 3, 4 so that partial channels 13 and 14 open freely toward the exterior of the coil. The stream 19 of the medium to be treated leaves partial channel 13 and, after being deflected in a conventional filter housing (not shown) in which the coiled membrane filter cartridge is accommodated, re-enters partial channel 14.

On the interior of the coil, permeate channel 34 is connected with passage openings 2" which are disposed axially in the jacket of central pipe 1 in the same manner as passage openings 2 or 2' but lie diametrally opposite thereto. An axially extending transverse wall 36 in the interior cavity of central pipe 1 hermetically separates the axially superposed inlet chamber 22 and concentrate discharge chamber 23 from a permeate collection channel 37 into which the permeate enters from permeate channel 34 through passage openings 2" in the direction of flow arrow 38 (FIG. 3). The permeate can then be brought out of permeate collection channel 37, for example in the direction of flow arrow 39 (FIG. 2) to axially and centrally leave the coiled membrane filter cartridge.

A third embodiment of the invention is shown in FIG. 4 where the coiled membrane is likewise shown in the unrolled state.

The embodiment of the coiled membrane filter cartridge according to the invention shown in FIG. 4 differs from the embodiment shown in FIG. 2 in that the side of flow channel 10 at the central pipe 1 is closed and partition 12 does not extend to central pipe 1 but ends upstream thereof in such a manner that, in the manner described in connection with FIG. 1, the stream of medium to be treated can be deflected without impediment in the sense of flow arrows 19; that is, the inlet stream 16 of the medium to be treated enters the first partial channel 13 from the exterior of the coil jacket, from a pressure vessel in which the coiled membrane 15 filter cartridge is disposed. Thereafter, the inlet stream is deflected in the manner indicated by flow arrows 19 immediately upstream of the central pipe 1 to enter concentrate channel 14 and leave the latter, in the direction of flow arrow 20, to re-enter the filtration housing surrounding the coil. Passage openings 2" for permeate discharge are arranged in such a manner that the two diametrally opposite glued seams 40, 40' for membranes 3, 4, lie at the jacket wall section of central pipe 1 facing the row of passage openings 2". That jacket wall section has no passage openings. Partial channels 13, 14 which open into the surrounding pressure vessel disposed around the exterior of the coil are hydrodynamically and hermetically separated from one another by suitable means disposed between coil jacket and the interior wall of the pressure housing, for example, by means of a soft O-ring 41. Thus, the coil according to FIG. 4 has an inlet port 42 on its outer jacket surface for the medium to be treated and a concentrate discharge port 43, while the permeate can be discharged in the manner described in connection with FIGS. 2 and 3 in one or both flow directions 39, 39'.

It will be understood that the above description of the present invention is susceptible to various modifications, changes and adaptations, and the same are intended to be comprehended within the meaning and range of equivalents of the appended claims.

What is claimed is:

1. In a coiled membrane filter cartridge including a central pipe having at least one axial row of openings through which fluid may radially pass into or out of the pipe; two superposed membranes wound in a plurality of turns about said pipe to form a membrane coil having opposite axial ends; said membranes being radially spaced from one another for defining, between themselves, a spiral flow channel being sealed at said axial ends; the improvement comprising a fluidtight partition extending between said membranes and being connected thereto; said partition hermetrically dividing said spiral flow channel longitudinally into axially adjoining partial channels; wherein said central pipe has passage openings and the flow channel has open radially inner and radially outer sides; the partition extending over the entire length of the membranes forming the flow channel and forming two partial channels; radially inward ends of the two partial channels being connected with the passage openings; further comprising a separating bottom being disposed in an interior cavity of the central pipe to hydrodynamically separate from one another said radially inward ends of said partial channels.

2. Filter cartridge according to claim 1, wherein said radially inward ends have different flow cross sections; said central pipe having an inlet for a medium to be treated and a concentrate outlet; said inlet and said concentrate outlet being separated from one another by said separating bottom; said inlet being connected to the radial inward end having the larger flow cross section and said concentrate outlet being connected to the radial inward end having the smaller flow cross section.

3. Filter cartridge according to claim 1, wherein said flow channel is closed on three sides and forms a permeate channel; further comprising a separate axial row of passage openings in said central pipe, a permeate discharge channel arranged in said central pipe and communicating with said separate axial row of passage openings; said permeate channel communicating with said permeate discharge channel by means of said separate row of axial openings; said central pipe further defining an inlet channel and a concentrate discharge channel separated from one another by said separating bottom and communicating with said radially inward ends; and means for separating said inlet channel and said concentrate discharge channel from said permeate discharge channel.

4. In a coiled membrane filter cartridge including a central pipe having at least one axial row of openings through which fluid may radially pass into or out of the pipe; two superposed membranes wound in a plurality of turns about said pipe to form a membrane coil having opposite axial ends; said membranes being radially spaced from one another for defining, between themselves, a spiral flow channel being sealed at said axial ends; the improvement comprising a fluidtight partition extending between said membranes and being connected thereto; said partition hermetically dividing said spiral flow channel longitudinally into axially adjoining partial channels; wherein the flow channel has a closed side and the partial channels freely communicate with one another at said closed side; further wherein said central pipe has passage openings and the closed side of the flow channel is disposed on the exterior of the coil; said partial channels each having a radially inner open end connected via the passage openings with an interior cavity of the central pipe; further comprising a separating bottom being disposed in the cavity for hydrodynamically separating the radially inner open ends from one another.

5. In a coiled membrane filter cartridge including a central pipe having at least one axial row of openings through which fluid may radially pass into or out of the pipe; two superposed membranes wound in a plurality of turns about said pipe to form a membrane coil having opposite axial ends; said membranes being radially spaced from one another for defining, between themselves, a spiral flow channel being sealed at said axial ends; the improvement comprising a fluidtight partition extending between said membranes and being connected thereto; said partition hermetically dividing said spiral flow channel longitudinally into axially adjoining partial channels; wherein the flow channel has a closed side and the partial channels freely communicate with one another at said closed side; further wherein said closed side is disposed at a radially inner end of the membrane coil and is fastened to said central pipe; said two partial channels having radially outer open ends communicating with a volume surrounding the filter cartridge; and a separating means subdividing said volume and hydrodynamically separating said radially outer open ends from one another.

6. In a coiled membrane filter cartridge including a central pipe having at least one axial row of openings through which fluid may radially pass into or out of the pipe; two superposed membranes wound in a plurality of turns about said pipe to form a membrane coil having opposite axial ends; said membranes being radially spaced from one another for defining, between themselves, a spiral flow channel being sealed at said axial ends; the improvement comprising a fluidtight partition extending between said membranes and being connected thereto; said partition hermetically dividing said spiral flow channel longitudinally into axially adjoining partial channels; further comprising a grid-like planar spacer situated in the flow channel and being integral with said partition.

7. Filter cartridge according to claim 6, wherein said partition constitutes an elastic sealing element.

8. Filter cartridge according to claim 6, wherein said spacer is homogeneously connected to said partition.

9. Filter cartridge according to claim 6, wherein said spacer and said partition constitute a one-piece component.

10. Filter cartridge according to claim 6, wherein said partition is bonded to said membranes.

11. Filter cartridge according to claim 6, wherein said partition is in a bond-free engagement with said membranes and is pressed fluidtight thereagainst by coil tension.

* * * * *